United States Patent
Smith et al.

(10) Patent No.: US 11,618,154 B2
(45) Date of Patent: Apr. 4, 2023

(54) FOLDIBLE REACHING AND GRASPING TOOL

(71) Applicant: Unger Marketing International, LLC, Bridgeport, CT (US)

(72) Inventors: Robert F. Smith, Waterbury, CT (US); James M. Buckley, New Hartford, CT (US); Joseph K. Patterson, Monroe, CT (US)

(73) Assignee: UNGER MARKETING INTERNATIONAL, LLC, Bridgeport, CT (US)

( * ) Notice: Subject to any disclaimer, the term of this patent is extended or adjusted under 35 U.S.C. 154(b) by 0 days.

(21) Appl. No.: 17/153,167

(22) Filed: Jan. 20, 2021

(65) Prior Publication Data

US 2021/0245361 A1 Aug. 12, 2021

Related U.S. Application Data

(60) Provisional application No. 62/972,364, filed on Feb. 10, 2020.

(51) Int. Cl.
*B25J 1/00* (2006.01)
*B25J 1/04* (2006.01)
*B25J 13/02* (2006.01)
*B25J 1/02* (2006.01)
*B25J 15/00* (2006.01)

(52) U.S. Cl.
CPC . *B25J 1/04* (2013.01); *B25J 1/02* (2013.01); *B25J 13/02* (2013.01); *B25J 15/0028* (2013.01)

(58) Field of Classification Search
CPC ....... B25J 1/00; B25J 1/04; B25J 13/02; B25J 15/0028; B25J 1/02; B25B 7/12; B25B 9/00; B26B 1/042; A46B 5/0058; E01H 1/12; E01H 2001/1293; A47F 13/06
USPC .......................................................... 294/209
See application file for complete search history.

(56) References Cited

U.S. PATENT DOCUMENTS

| | | | |
|---|---|---|---|
| 847,200 A * | 3/1907 | Neddo | B25J 1/04 294/22 |
| 1,120,735 A * | 12/1914 | Moyer | B25J 1/04 294/22 |
| 3,591,226 A | 7/1971 | Hobson, Jr. | |
| 4,225,174 A | 9/1980 | Hennessy et al. | |
| 4,374,600 A | 2/1983 | van Zelm | |
| 4,613,179 A * | 9/1986 | van Zelm | B25J 1/02 294/111 |
| 4,863,204 A | 9/1989 | Peters | |

(Continued)

FOREIGN PATENT DOCUMENTS

FR 2842840 A1 * 1/2004 ........... E01H 1/1206

OTHER PUBLICATIONS

International Search Report and Written Opinion for International Application No. PCT/US2021/15168 dated Apr. 8, 2021, 8 pgs.

*Primary Examiner* — Dean J Kramer
(74) *Attorney, Agent, or Firm* — Cantor Colburn LLP

(57) ABSTRACT

A reaching and grabbing tool is provided. The tool includes a trigger assembly having a trigger and a handle. A jaw assembly is provided having at least one jaw operably connected to the trigger to move the at least one jaw. A hinge assembly is disposed between the trigger assembly and the jaw assembly, the hinge assembly being selectively lockable between an operating position and a folded position.

15 Claims, 9 Drawing Sheets

(56) References Cited

U.S. PATENT DOCUMENTS

| | | | |
|---|---|---|---|
| 4,962,957 A | 10/1990 | Traber | |
| 6,508,496 B1* | 1/2003 | Huang | E01H 1/12 |
| | | | 294/115 |
| 6,513,844 B1* | 2/2003 | Hsu | B25J 1/04 |
| | | | 294/115 |
| 6,520,556 B1 | 2/2003 | Hsu | |
| 6,848,731 B2 | 2/2005 | Khubani et al. | |
| 7,004,520 B2* | 2/2006 | Khubani | B25G 1/06 |
| | | | 294/111 |
| 7,344,171 B1* | 3/2008 | McMullan | E01H 1/1206 |
| | | | 294/902 |
| 7,686,361 B1* | 3/2010 | Flinn | E01H 1/1206 |
| | | | 294/111 |
| 7,980,609 B2 | 7/2011 | Khubani | |
| 9,132,544 B2 | 9/2015 | Levkus | |
| 9,138,070 B1* | 9/2015 | Shamie | A47D 9/005 |
| 9,363,990 B2* | 6/2016 | Squires | A01M 31/02 |
| 9,486,915 B2 | 11/2016 | Buzby et al. | |
| 9,931,748 B2 | 4/2018 | Buzby et al. | |
| 10,456,904 B1 | 10/2019 | Stirtz | |
| 10,500,715 B1* | 12/2019 | Fleming | B25J 18/04 |
| 2003/0193204 A1 | 10/2003 | Thom et al. | |
| 2007/0035144 A1* | 2/2007 | Buzby | B25B 7/12 |
| | | | 294/137 |
| 2007/0085358 A1 | 4/2007 | Robinson et al. | |
| 2014/0008930 A1 | 1/2014 | James | |
| 2021/0204685 A1* | 7/2021 | Christensen | A61L 2/24 |

* cited by examiner

FOLDIBLE REACHING AND GRASPING TOOL

CROSS REFERENCE TO RELATED APPLICATIONS

This application claims the benefit of U.S. Provisional Application Ser. No. 62/972,364, filed Feb. 10, 2020, the entire disclosure of which is incorporated herein by reference.

BACKGROUND

The subject matter disclosed herein relates to a reaching and grasping tool, and more particularly to a reaching and grasping tool that is foldable.

Reaching and grasping tools have proven useful to extend the reach of users to, for example, grasp items above the user (e.g., on a shelf) or below the user (e.g., on the ground).

These tools typically have a trigger or actuator that causes a pair of gripping heads to open and close. The trigger and the gripping head are separated by a pole. In some cases the poles are telescoping extensions that allow the user to reach for items at different distances. One challenge with these devices includes the storage or transportation/carrying of the item when it is not in use. The length of the pole makes it inconvenient to carry and it won't fit in typical storage containers, such as a pocketbook/bag or a backpack.

Accordingly, while existing reaching and grasping tools are suitable for their intended purposes the need for improvement remains, particularly in providing a reaching an grasping tool having the features described herein.

BRIEF DESCRIPTION

According to one aspect of the disclosure a reaching and grabbing tool is provided. The tool includes a trigger assembly having a trigger and a handle. A jaw assembly is provided having at least one jaw operably connected to the trigger to move the at least one jaw. A hinge assembly is disposed between the trigger assembly and the jaw assembly, the hinge assembly being selectively lockable between an operating position and a folded position.

In addition to one or more of the features described herein, or as an alternative, further embodiments of the tool may include the trigger assembly further comprising a first trigger operably connected to the at least one jaw. In addition to one or more of the features described herein, or as an alternative, further embodiments of the tool may include a cable operably coupled between the first trigger and the at least one jaw, the cable extending through the hinge assembly. In addition to one or more of the features described herein, or as an alternative, further embodiments of the tool may include a biasing member, wherein the cable is further comprised of a first cable coupled to the first trigger and a second trigger coupled to the at least one jaw, and the biasing member is coupled between the first cable and the second cable. In addition to one or more of the features described herein, or as an alternative, further embodiments of the tool may include the trigger assembly further comprising a housing having a rack, and a second trigger rotatably coupled to the first trigger, the second trigger having a plurality of teeth positioned to selectively engage the rack.

In addition to one or more of the features described herein, or as an alternative, further embodiments of the tool may include the at least one jaw being movably coupled to a second jaw. In addition to one or more of the features described herein, or as an alternative, further embodiments of the tool may include the second jaw being in a fixed position relative to the hinge assembly.

In addition to one or more of the features described herein, or as an alternative, further embodiments of the tool may include the hinge assembly having a lock that is selectively engagable based at least in part on the position of the jaw assembly relative to the trigger assembly. In addition to one or more of the features described herein, or as an alternative, further embodiments of the tool may include the lock having a first housing with a recess, a lock pawl movably disposed in the recess, a biasing member disposed to bias the lock pawl into the recess, and a release button operably coupled to the lock pawl. In addition to one or more of the features described herein, or as an alternative, further embodiments of the tool may include the lock pawl being arranged to move from an engaged position within the recess to a released position in response to movement of the release button.

According to another aspect of the disclosure a reaching and grabbing tool is provided. The tool including a trigger assembly having at least a first trigger. A hinge assembly is coupled to and spaced apart from the trigger assembly, the hinge assembly being selectively rotatable between an operating position and a folded position. A jaw assembly is coupled to and spaced apart from the hinge assembly, the jaw assembly having at least one jaw operably coupled to the first trigger, the at least one jaw being configured to move from an open position to a second position in response to movement of the first trigger.

In addition to one or more of the features described herein, or as an alternative, further embodiments of the tool may include a first pole coupled between the trigger assembly and the hinge assembly, and a second pole coupled between the hinge assembly and the jaw assembly. In addition to one or more of the features described herein, or as an alternative, further embodiments of the tool may include a cable operably coupled to the first trigger and the at least one jaw, the cable being at least partially disposed in the first pole and the second pole. In addition to one or more of the features described herein, or as an alternative, further embodiments of the tool may include the jaw assembly further having a fixed jaw, the at least one jaw being movably coupled to the fixed jaw.

In addition to one or more of the features described herein, or as an alternative, further embodiments of the tool may include the first jaw having a hole, and the jaw assembly further having a movable actuator disposed in the hole and being operably coupled to the at least one jaw, the movable actuator being coupled to the cable. In addition to one or more of the features described herein, or as an alternative, further embodiments of the tool may include the actuator having a rack and the at least one jaw includes a plurality of teeth, the rack and the plurality of teeth cooperating to rotate the at least one jaw in response to a movement of the cable. In addition to one or more of the features described herein, or as an alternative, further embodiments of the tool may include the jaw assembly further having a biasing member disposed to bias the actuator to rotate the at least one jaw to an open position.

In addition to one or more of the features described herein, or as an alternative, further embodiments of the tool may include the trigger assembly further having a second trigger rotatably coupled to the first trigger, the second trigger being selectively lock a position of the first trigger in response to movement of the first trigger. In addition to one or more of the features described herein, or as an alternative, further embodiments of the tool may include the second trigger being configured to selectively release the first trigger in response to a movement of the second trigger.

In addition to one or more of the features described herein, or as an alternative, further embodiments of the tool may include the hinge assembly further having a lock that selectively holds the first pole and the second pole in an operating position and a folding position. In addition to one or more of the features described herein, or as an alternative, further embodiments of the tool may include the lock comprising: a first housing having a recess with a pair of recess portions; a lock pawl selectively engagable with the recess, the lock pawl having a pair of teeth, the pair of teeth engaging the pair of recess portions when the lock pawl is engaged in the recess; a release button movably coupled to the first housing an operably coupled to the lock pawl, the release button moving the lock pawl from engaging the recess in response to movement of the release button; and a biasing member operably coupled to the lock paw to move the lock pawl into the recess when the teeth are aligned with the recess portions.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

Figure 1:
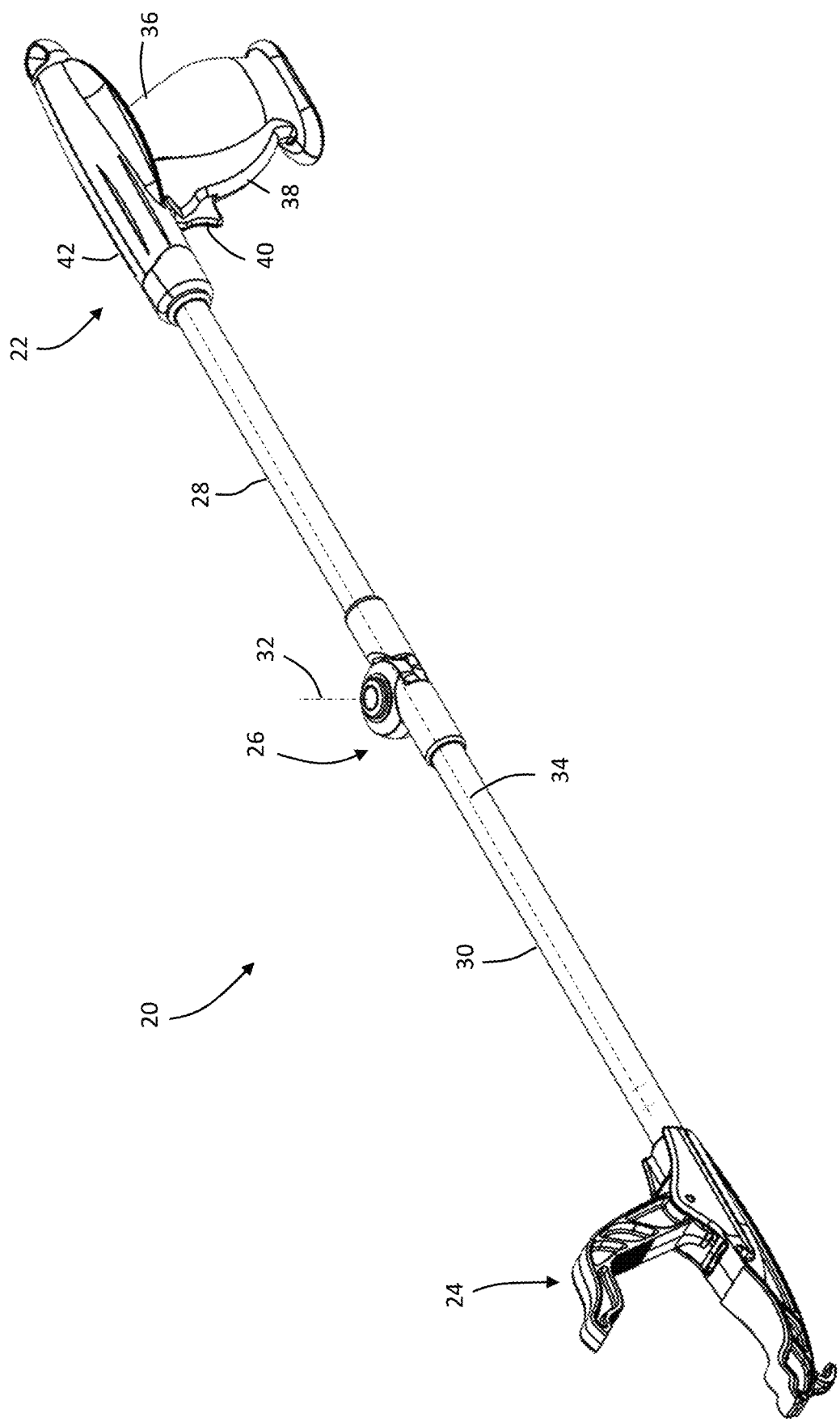
FIG. 1 is a perspective view of a reaching and grasping tool in accordance with an embodiment.

The detailed description explains embodiments of the disclosure, together with advantages and features, by way of example with reference to the drawings.

DETAILED DESCRIPTION

A foldable reaching and grabbing tool is provided that has gripping head with at least one jaw operatively connected to a trigger for movement with respect to a gripping axis. In an embodiment, the gripping head defines at least one region configured to provide a plurality of gripping states.

Referring now to FIGS. 1-7 an embodiment is shown of a reaching and grabbing tool 20. The tool 20 includes a trigger assembly 22, a jaw assembly 24 and a hinge assembly 26 disposed therebetween. The hinge assembly 26 is separated from the trigger assembly 22 by a first pole 28. The hinge assembly 26 is separated from the jaw assembly 24 by a second pole 30. The hinge assembly 26 has an axis of rotation 32 that is offset from the main axis 34 of the poles 28, 30. As will be discussed in more detail herein, the offset of the axis 32 facilitates the folding of the tool 20 to a folded position with the jaw assembly 24 adjacent the trigger assembly 22 (FIG. 8).

Figure 2:
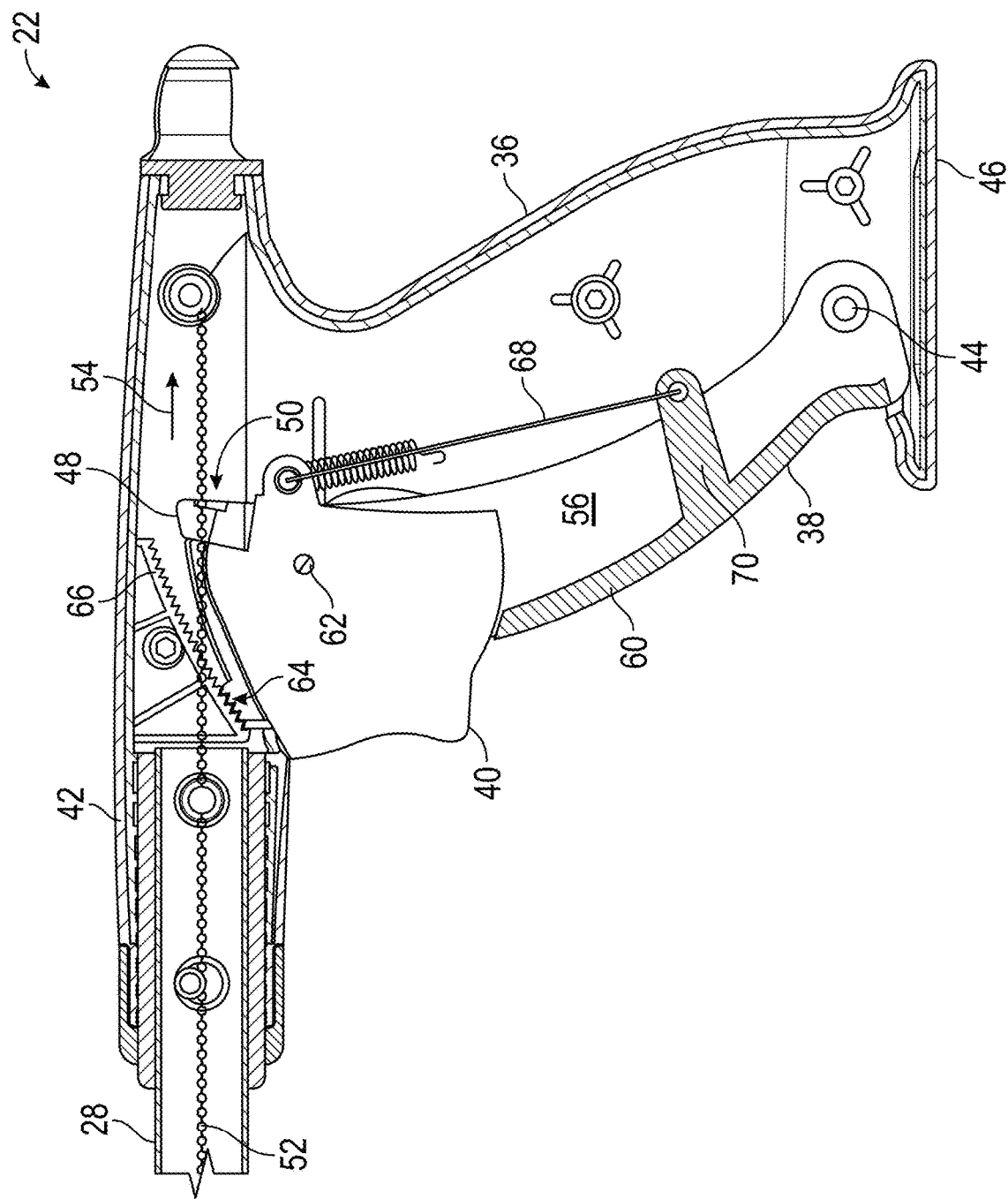
FIG. 2 is a partial sectional view of the trigger assembly for the tool of FIG. 1.

The trigger assembly 22 includes a housing 36 that may be formed in two halves that are then coupled together to define a hollow interior. In the illustrated embodiment, the housing is in the shape of a pistol grip that has an opening positioned to allow a portion of a jaw actuation trigger 38 and a ratchet trigger 40. The housing further includes a barrel portion 42 on an end of the pistol grip. The barrel portion 42 couples with the first pole 28. The jaw actuation trigger 38 is rotatably coupled to the housing 36 by a pivot 44 (FIG. 2). In the illustrated embodiment, the pivot 44 is positioned near a bottom 46 of the pistol grip. An opposite end of jaw actuation trigger 38 is a tab 48 having a hole 50 extending therethrough. A cable crimp and washer (not shown for clarity) is coupled to the cable adjacent hole 50 to fix or couple a cable 52 to the jaw activation trigger 38. The cable 52 extends through the poles 28, 30 and the hinge assembly 26 to connect the trigger assembly 22 to the jaw assembly 24. As discussed in more detail herein, in one embodiment, the end of the cable opposite the trigger assembly is coupled to an inline spring. It should be appreciated that when a user squeezes the jaw activation trigger 38, the jaw activation trigger 38 rotates about the pivot 44 causing the cable 52 to move in the direction indicated by arrow 54. As will be discussed in more detail herein, then the jaw activation trigger 38 is released, a biasing member in the jaw assembly 24 causes the cable 52 to move in the opposite direction and the jaw activation trigger 38 returns to the original position.

Figure 3:
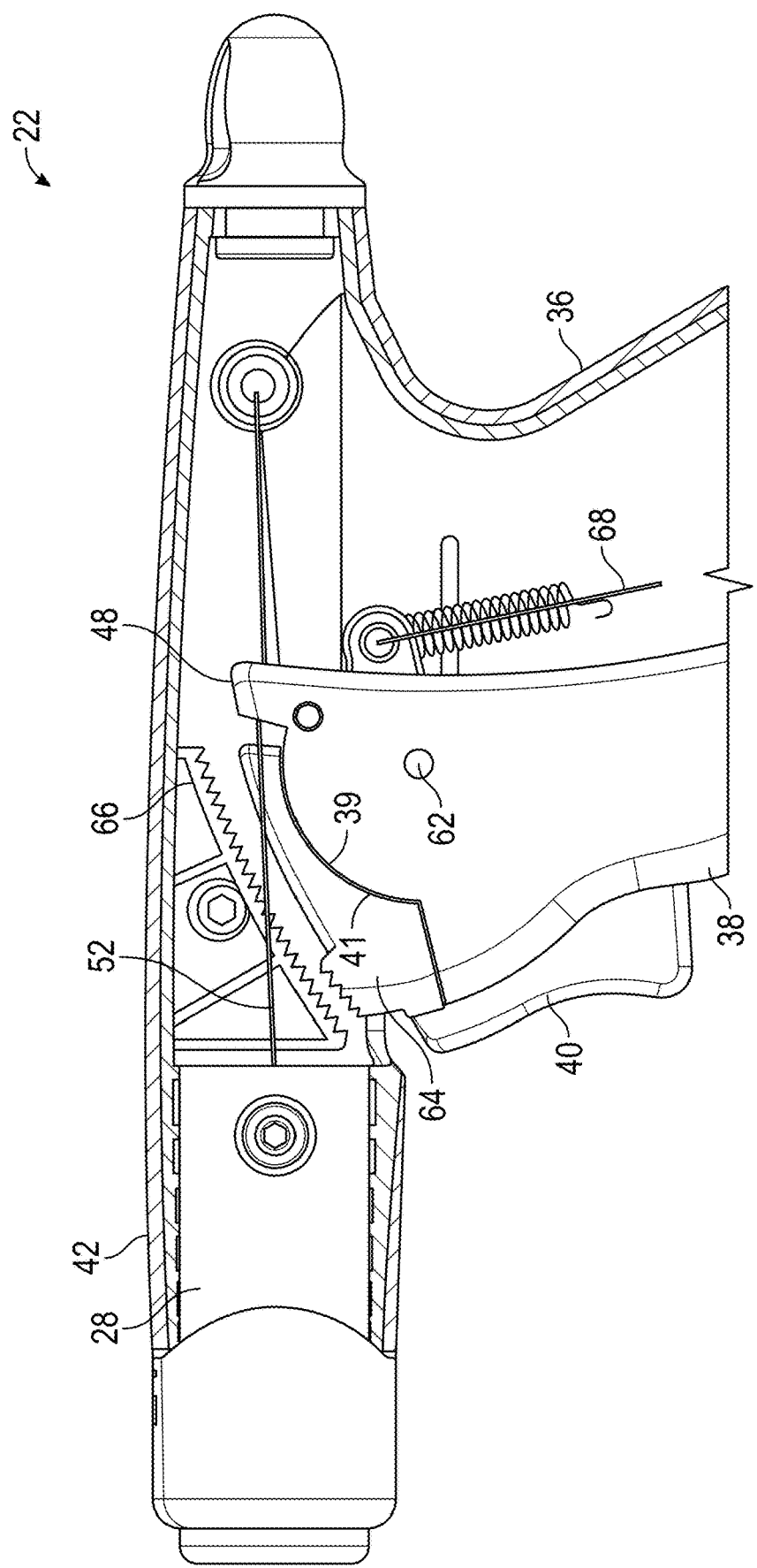
FIG. 3 is a partial sectional view of the trigger assembly with the ratchet trigger disengaged.

In the illustrated embodiment, the jaw activation trigger 38 includes a pair of parallel side walls 56 that are spaced apart by an end wall 60. The side walls 56 define a channel sized to receive the ratchet trigger 40. The ratchet trigger 40 is coupled to the side walls 56 by a pivot 62. The ratchet trigger 40 is movable between an engaged position (FIG. 2) and a disengaged position (FIG. 3). The ratchet trigger 40 includes a plurality of teeth 64 that are positioned to engage a rack 66 formed into the housing 36. A biasing member, such as spring 68 is coupled between the ratchet trigger 40 and an arm 70 on the jaw activation trigger 38. The position of the spring attachment on the ratchet trigger 40 is configured to rotate the teeth 64 into the rack 66. In an embodiment, the ratchet trigger 40 includes two pairs of teeth 64 that are arranged on either side of the centerline of the housing 36. This allows the cable 52 to pass and move therebetween.

The ratchet trigger 40 and the jaw activation trigger 38 cooperate to allow the user to grasp and carry an item without having to continuously squeeze the jaw activation trigger. The user can selectively release the object by squeezing the ratchet trigger 40 to disengage the teeth 64 from the rack 66. When the user squeezes the jaw actuation trigger 38, it rotates about the pivot 44. When the user releases the jaw actuation trigger 38, and the ratchet trigger 40 is also not squeezed, the engagement of the teeth 64 keeps the ratchet trigger 40 in place and prevents the jaw actuation trigger 38 from rotating back towards the unreleased or open position. In an embodiment, a portion of the surface 39 engages the surface 41 to prevent rotation of the triggers 38, 40 relative to each other. As a result, the user may select the amount of force to apply to the gripped item without having to continuously squeeze the jaw actuation trigger 38.

Further, by keeping the ratchet trigger 40 squeezed, while actuating the jaw actuation trigger 38, the teeth 64 remain released from the rack 66 to allow normal free grasping and release of the jaw assembly 24. When the ratchet trigger 40 is squeezed without squeezing or movement of the jaw actuation trigger 38, the jaw assembly 24 will remain in a locked position around the gripped item without the user having to maintain a squeezing force. Pressing and holding the ratchet trigger 40 releases the teeth 64 from the rack 66, allowing the jaw actuation trigger 38 to rotate back and thus release the jaw assembly and cause the jaws to move to an open position.

Figure 4A:
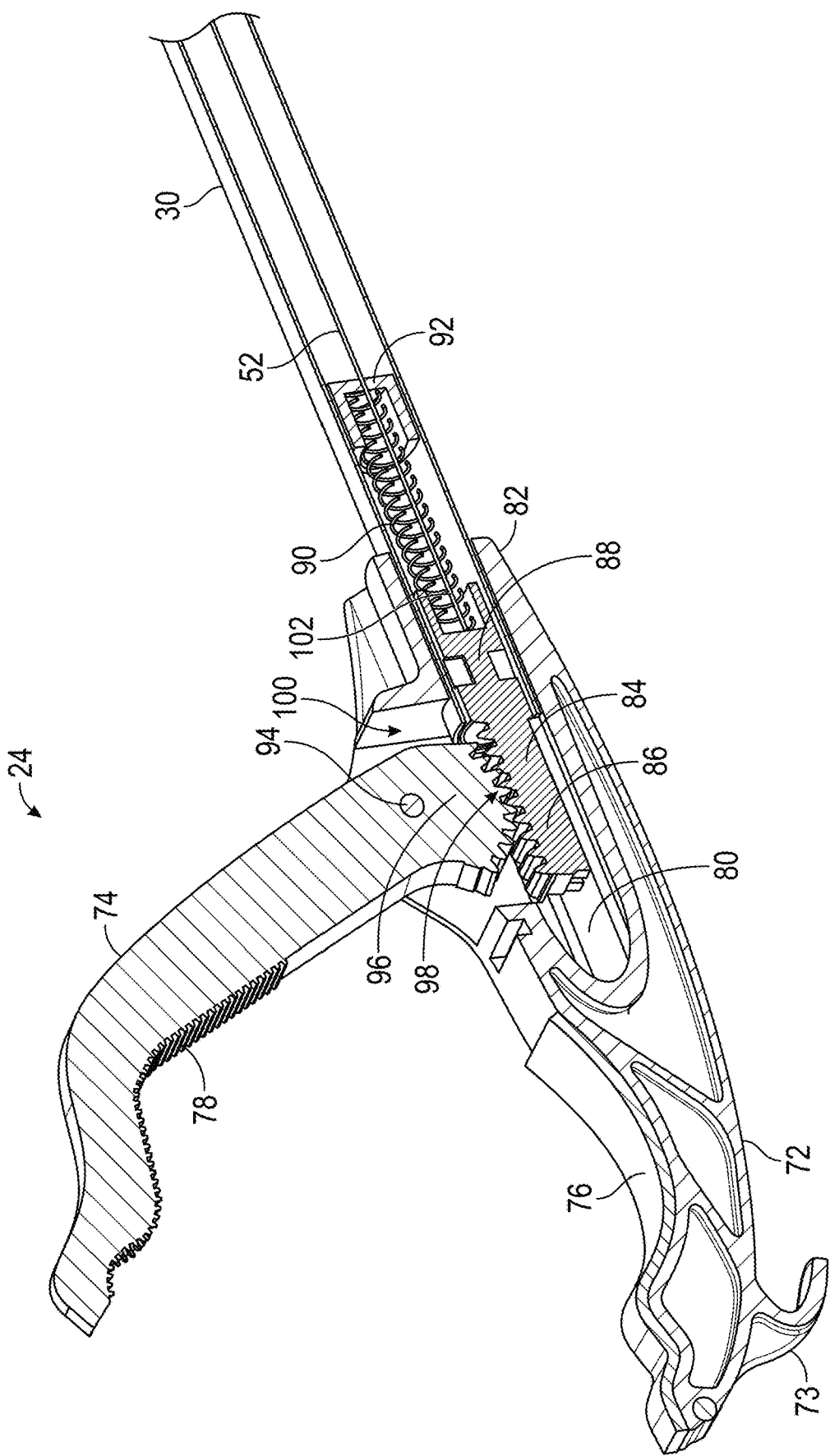
FIG. 4A is a partial sectional view of the jaw assembly for the tool of FIG. 1.

Referring now to FIG. 4A, the jaw assembly 24 is shown in an open position. The jaw assembly 24 includes a fixed jaw 72 and a movable jaw 74. Each of the jaws 72, 74 have a contoured surface 76, 78 that allows for multiple sizes of objects to be grasped therebetween. In an embodiment, the surface 76 includes a layer thereon made from a soft and non-slip material. In an embodiment, the surface 78 may include a plurality of teeth for gripping the item held in the jaws 72, 74. The fixed jaw 72 includes an opening 80 at one end 82 that is sized to receive and couple with the pole 30. Arranged within the hole 80 is movable actuator 84 that includes a rack portion 86 and a body portion 88. The body portion 88 has an outer surface shaped to conform with the hole 80 to allow the actuator 84 to slide within the hole. The body portion 88 further includes a bore at one end sized to receive a biasing member, such as compression spring 90. The spring 90 is disposed between the actuator 84 and a collar 92 that is fixedly coupled to the inner diameter of the pole 30.

In an embodiment, the fixed jaw 72 may have a projection 73 disposed on a side opposite the movable jaw 74. The projection 73 may be in the shape of a hook, defining a generally u-shaped slot. It should be appreciated that the projection 73 provides advantages in allowing the use to pick things up with the projection 73 that may be difficult with the jaws 72, 74. The projection 73 may also be used for hanging the tool 20 when not in use.

The movable jaw 74 is coupled to the fixed jaw 72 by a pivot 94. The movable jaw 74 includes a first end 96 having a plurality of teeth 98 formed on the end. The teeth 98 are sized, shaped, and positioned to engage the rack portion 86 of the movable actuator 84. In the illustrated embodiment, the fixed jaw 72 includes a slot 100 that is in communication with the hole 80. In this embodiment, the end 96 and the pivot 94 are disposed within the slot 100. In operation, when the jaw actuation trigger 38 is moved, the end 102 of the cable 52 is pulled towards the trigger assembly 22, causing the actuator 84 to slide within the hole 80. As the actuator 84 moves, the engagement of the rack portion 86 with the teeth 98 causes the rotation of the movable jaw 74. The movement of the actuator 84 further compresses the spring 90. When the user releases the jaw actuation trigger 38, the spring biases the actuator 84 in a direction away from the trigger assembly 22 causing a reversal in the rotation of the movable jaw 74.

Figure 4B:
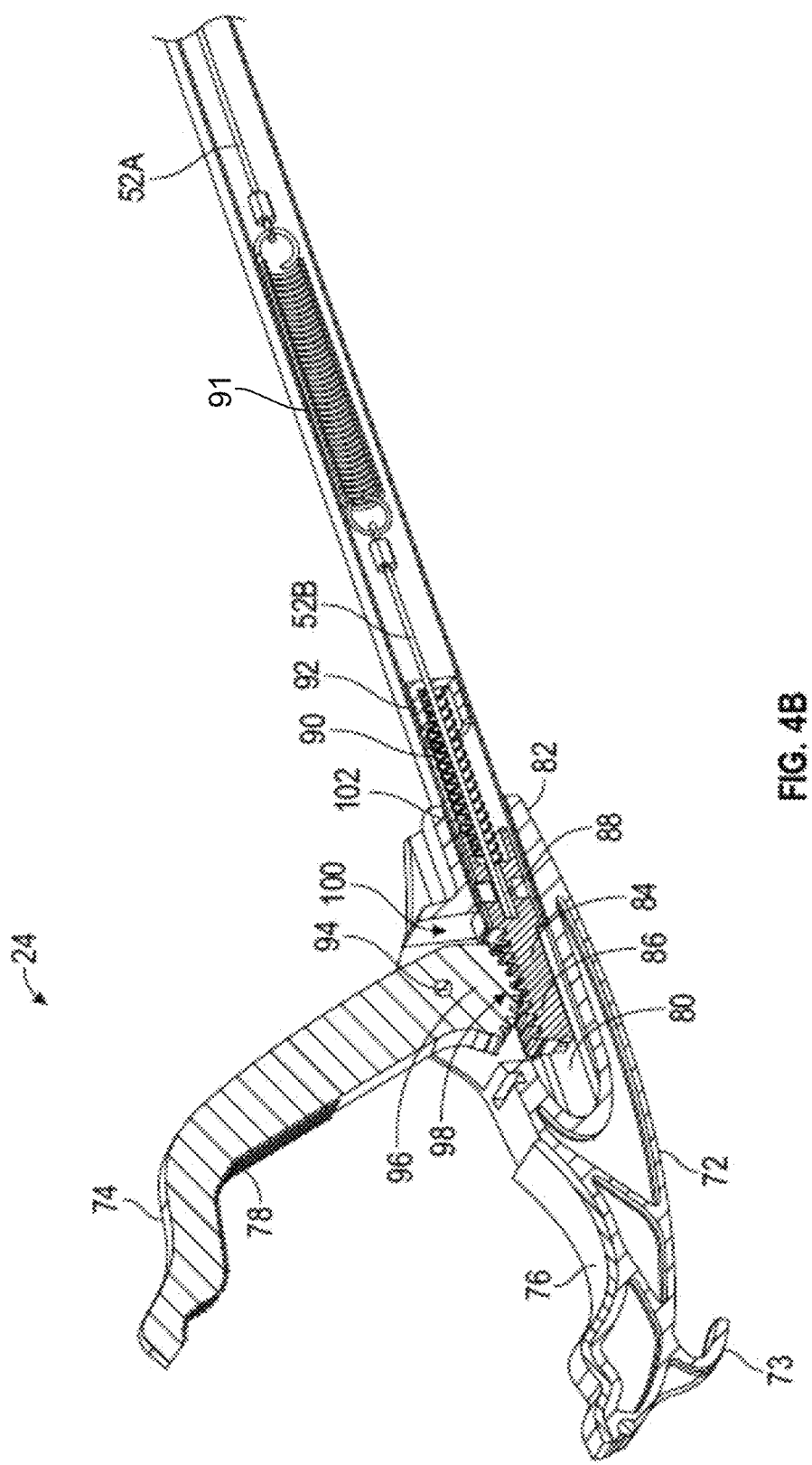
FIG. 4B is a partial sectional view of the jaw assembly and second pole in accordance with another embodiment.

In another embodiment, shown in FIG. 4B, the cable is split or bifurcated into a first cable 52A and a second cable 52B. The cables 52A, 52B are connected with a biasing member, such as extension spring 91. The extension spring 91 provides additional elasticity in the cable path that provides advantages in extending to take up the cable length when the tool 20 is folded. The spring 91 further provides additional advantages in keeping tension on the jaw 74 when grasping an item with the tool 20. The spring 91 provides still further advantages in allowing further stroke (e.g. movement of the jaw actuation trigger 38) on the trigger assembly 22 after the jaw travel is stopped by the gripped object.

Figure 5:
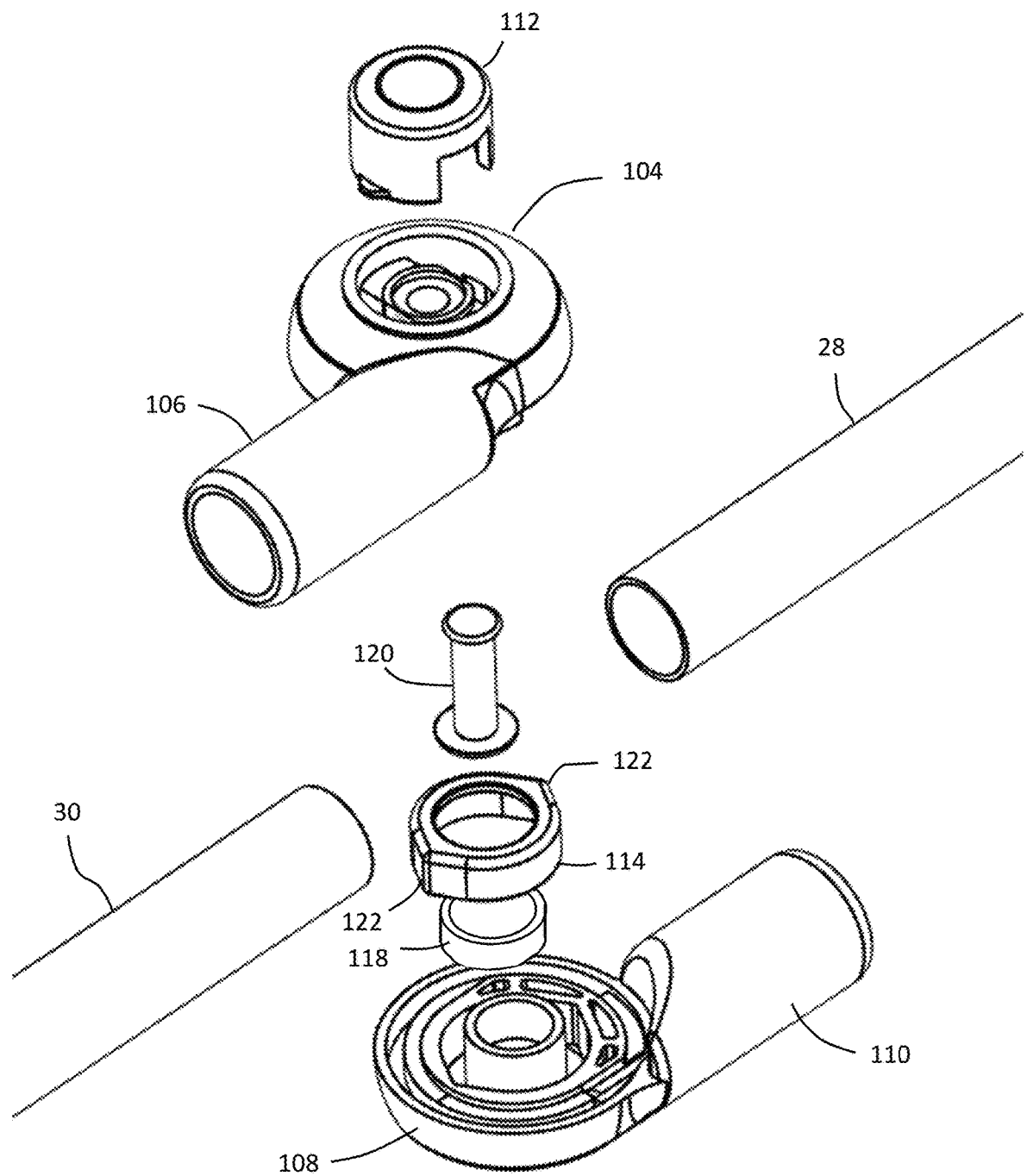
FIG. 5 is an unassembled view of the hinge assembly for the tool of FIG. 1.
Figure 6:
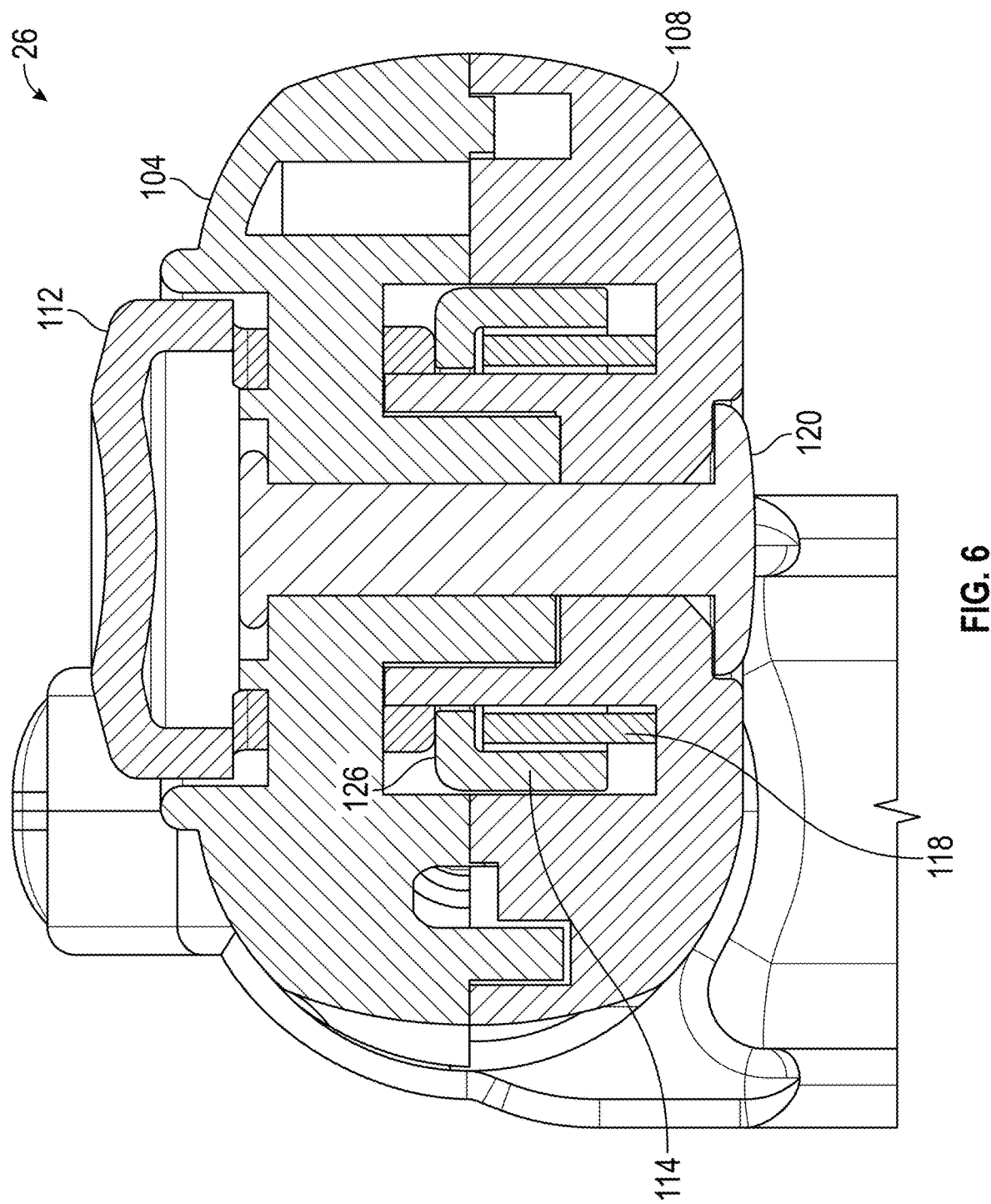
FIG. 6 is a partial sectional view of the hinge assembly of FIG. 5.
Figure 7:
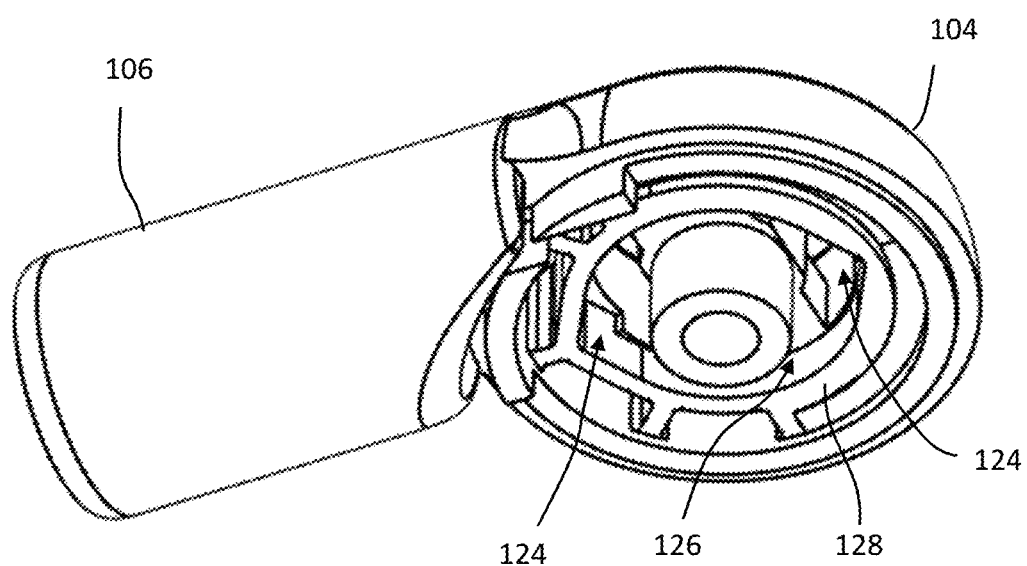
FIG. 7 is a perspective view of a housing for use in the hinge assembly of FIG. 6.
Figure 8:
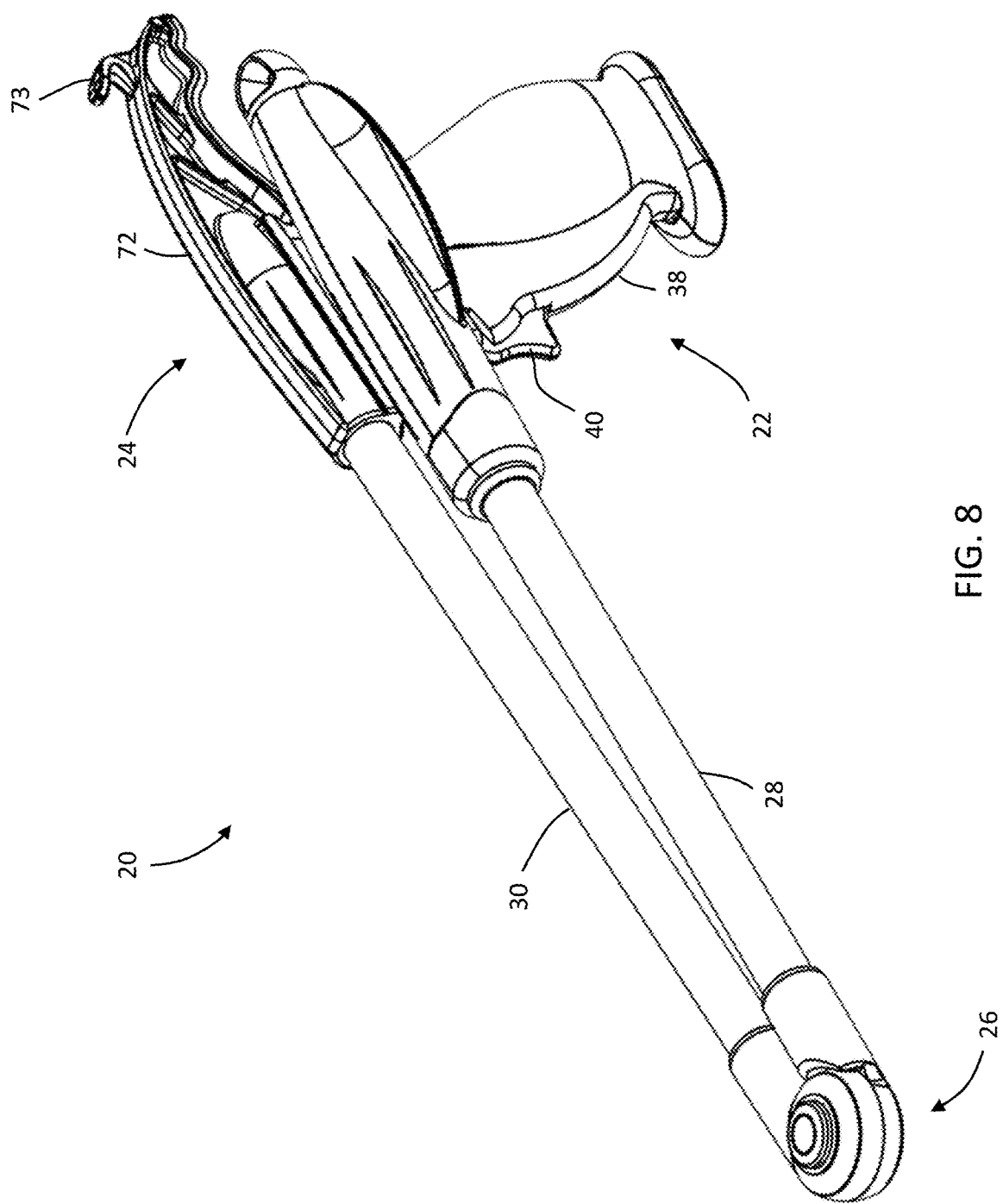
FIG. 8 is a perspective view of the tool of FIG. 1 in a folded position.

Referring now to FIG. 5, FIG. 6, and FIG. 7, an embodiment of the hinge assembly 26 is shown. The hinge assembly 26 includes a first housing 104 having a tubular projection 106 that is sized and configured to couple with the pole 30. The hinge assembly 26 further includes a second housing 108 having a tubular projection 110 that is sized and configured to couple with the pole 28. A release button 112 is coupled to the first housing, and a lock pawl 114 and a biasing member 118 are disposed within the housings 104, 108. The housings 104, 108 are coupled together by a fastener 120. In an embodiment, the biasing member 118 is a spring.

The lock pawl 114 includes a pair of teeth 122 that engage and cooperate with recess portions 124 of recess 126 in the first housing 104. In response to the user depressing the release button 112, the lock pawl 114 moves laterally causing the teeth 122 to move out of the recess portions 124. As a result, the first housing 104 and the second housing 108 can rotate relative to each other. In an embodiment, once the housings 104, 108 are rotated relative to each other, the top end of the lock pawl 114 engages the surface 128 of the first housing 104 to prevent locking of the hinge assembly 26 until the teeth 122 are once again aligned with the recess portions 124. Once the teeth 122 and the recess portions 124 are aligned, the lock pawl 114 and the release button 112 are moved by the biasing member 118 back into the locked position and relative rotation between the first housing 104 and the second housing 108 is prevented. In an embodiment, when the tool is in a fully folded position and in an operating position, the teeth 122 are aligned with the recess portions 124. In other words, in this embodiment, the tool 20 will be locked in both the operating position and the folded position until the user depresses the release button 112.

When the release button 112 is depressed and the hinge assembly 26 is unlocked, the tool 20 may be moved from the operating or extended position (FIG. 1) to a folded position (FIG. 8). When in the folded position, the jaw assembly 24 is positioned adjacent the trigger assembly 22. It should be appreciated that the ability to fold the tool 20 provides advantages in reducing the length of the tool 20 to facilitate storage or transportation of the tool 20, such as by allowing it to be stored in a drawer or carried in a handbag for example.

In some embodiments, the folding of the tool 20 from the operating position to the folding position increases the distance between the tab 48 and the movable actuator 84. Thus, as the tool 20 is folded, the actuator 84 will move against and compressing the spring 90 to compensate for the change in length. As a result, during the folding process, the jaw 74 may move.

The term "about" is intended to include the degree of error associated with measurement of the particular quantity based upon the equipment available at the time of filing the application.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection". It should also be noted that the terms "first", "second", "third", "upper", "lower", and the like may be used herein to modify various elements. These modifiers do not imply a spatial, sequential, or hierarchical order to the modified elements unless specifically stated.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A reaching and grabbing tool comprising:
   a trigger assembly having at least one trigger and a handle;
   a jaw assembly having at least one jaw being operably connected to the trigger to move the at least one jaw, wherein the at least one jaw is moveably coupled to a second jaw by a pivot by which the at least one jaw is movably coupled to the second jaw and an actuator arranged within an opening in the second jaw to actuate a rotation of the movable jaw about the pivot; and
   a hinge assembly disposed between the trigger assembly and the jaw assembly, the hinge assembly being selectively lockable between an operating position and a folded position at which the jaw assembly is sidelong-adjacent the trigger assembly and out-of-plane from the handle, wherein the second jaw is in a fixed position relative to the hinge assembly and the opening is partially aligned with a portion of a contoured surface of the second jaw.

2. The tool of claim 1, wherein the trigger assembly further comprises:
   a housing comprising a rack;
   a first trigger operably connected to the at least one jaw and rotatably coupled to the housing; and
   a second trigger rotatably coupled to the first trigger and having a plurality of teeth positioned to selectively engage the rack.

3. The tool of claim 2, further comprising a cable operably coupled between the first trigger and the at least one jaw, the cable extending through the hinge assembly.

4. The tool of claim 3, further comprising:
   a first pole coupled between the trigger assembly and the hinge assembly; and
   a second pole coupled between the hinge assembly and the jaw assembly,
   wherein the cable comprises:
   a first cable coupled to the first trigger and extending through the first pole, the hinge assembly and a proximal portion of the second pole;
   a second cable coupled to the at least one jaw and extending through a distal portion of the second pole; and
   a biasing member coupled between the first cable and the second cable and extending through the second pole.

5. The tool of claim 2, wherein the first trigger is rotatably coupled to the housing via a first pivot and the second trigger is rotatably coupled to the first trigger via a second pivot which is separate from the first pivot.

6. The tool of claim 1, wherein the hinge assembly includes a lock that is selectively engagable based at least in part on a position of the jaw assembly relative to the trigger assembly.

7. The tool of claim 6, wherein the lock includes a first housing having a recess, a lock pawl movably disposed in the recess, a biasing member disposed to bias the lock pawl into the recess, and a release button operably coupled to the lock pawl.

8. The tool of claim 7, wherein the lock pawl is arranged to move from an engaged position within the recess to a released position in response to movement of the release button.

9. A reaching and grabbing tool comprising:
   a trigger assembly having at least a first trigger and a handle;
   a hinge assembly coupled to and spaced apart from the trigger assembly, the hinge assembly being selectively rotatable between an operating position and a folded position;
   a first pole coupled between the trigger assembly and the hinge assembly, and a second pole coupled between the hinge assembly and a jaw assembly; and
   the jaw assembly coupled to and spaced apart from the hinge assembly, the jaw assembly having at least one jaw being operably coupled to the first trigger, a cable operably coupled to the first trigger and the at least one jaw, wherein the cable comprises a first cable coupled to the first trigger and extending through the first pole, the hinge assembly and a proximal portion of the second pole, a second cable coupled to the at least one jaw and extending through a distal portion of the second pole, and a biasing member coupled between the first cable and the second cable and extending through the second pole,
   the at least one jaw being configured to move from an open position to a second position in response to movement of the first trigger, the folded position being characterized in that the jaw assembly is sidelong-adjacent the trigger assembly and out-of-plane from the handle,
   the jaw assembly further includes a fixed jaw, the at least one jaw being movably coupled to the fixed jaw, wherein the fixed jaw includes a first opening partially aligned with a portion of a contoured surface of the fixed jaw, and the jaw assembly further includes a pivot by which the at least one jaw is movably coupled to the fixed jaw and a movable actuator coupled to the cable and arranged within the fixed jaw to actuate a rotation of the at least one jaw about the pivot.

10. The tool of claim 9, wherein the movable actuator includes a rack and the at least one jaw includes a plurality of teeth, the rack and the plurality of teeth cooperating to rotate the at least one jaw in response to a movement of the cable.

11. The tool of claim 10, wherein the jaw assembly further includes a biasing member disposed to bias the movable actuator to rotate the at least one jaw to the open position.

12. The tool of claim 9, wherein the first trigger is rotatably coupled to a housing of the trigger assembly via a first pivot and the trigger assembly further includes a second trigger rotatably coupled to the first trigger via a second pivot which is separate from the first pivot, the second trigger comprising teeth to selectively engage a rack of the housing to selectively lock a position of the first trigger in response to movement of the first trigger.

13. The tool of claim 12, wherein the second trigger is configured to selectively release the first trigger in response to a movement of the second trigger.

14. The tool of claim 9, wherein the hinge assembly further comprises a lock that selectively holds the first pole and the second pole in the operating position and the folded position.

15. The tool of claim 14, wherein the lock comprises:
a first housing having a recess with a pair of recess portions;
a lock pawl selectively engagable with the recess, the lock pawl having a pair of teeth, the pair of teeth engaging the pair of recess portions when the lock pawl is engaged in the recess;
a release button movably coupled to the first housing an operably coupled to the lock pawl, the release button moving the lock pawl from engaging the recess in response to movement of the release button; and
a biasing member operably coupled to the lock pawl to move the lock pawl into the recess when the pair of teeth are aligned with the pair of recess portions.

* * * * *